United States Patent

Hayasawa et al.

[11] Patent Number: 6,156,368
[45] Date of Patent: Dec. 5, 2000

[54] LACTOSE-CONTAINING FOOD COMPOSITION FOR INFANTS

[75] Inventors: Hirotoshi Hayasawa; Kouichi Takahashi; Kazuyoshi Nanba; Takashi Simizu, all of Kanagawa; Kouji Sayama, Hokkaido; Yosuke Shimizu, Hokkaido; Tsutom Aritsuka, Hokkaido; Taizo Nagura, Hokkaido, all of Japan

[73] Assignee: Morinaga Milk Industry Co., Ltd., Tokyo, Japan

[21] Appl. No.: 09/043,770

[22] PCT Filed: Sep. 18, 1996

[86] PCT No.: PCT/JP96/02681

§ 371 Date: Aug. 19, 1998

§ 102(e) Date: Aug. 19, 1998

[87] PCT Pub. No.: WO97/12526

PCT Pub. Date: Apr. 10, 1997

[30] Foreign Application Priority Data

Sep. 29, 1995 [JP] Japan .................................... 7-252996
Jul. 2, 1996 [JP] Japan .................................... 8-172710
Jul. 15, 1996 [JP] Japan .................................... 8-185227

[51] Int. Cl.[7] ..................................................... A23C 9/00
[52] U.S. Cl. .......................... 426/580; 426/657; 426/658; 426/801
[58] Field of Search ..................................... 426/580, 583, 426/587, 588, 658, 661, 801, 656, 657

[56] References Cited

U.S. PATENT DOCUMENTS

| | | | |
|---|---|---|---|
| 2,659,676 | 11/1953 | Howard et al. | 426/801 |
| 3,649,295 | 3/1972 | Bernhart | 426/607 |
| 3,901,979 | 8/1975 | Nagasawa et al. | 426/801 |
| 5,439,893 | 8/1995 | Richards et al. | 514/53 |
| 5,843,922 | 12/1998 | Whistler et al. | 514/61 |

*Primary Examiner*—Leslie Wong
*Attorney, Agent, or Firm*—Wenderoth, Lind & Ponack, L.L.P.

[57] ABSTRACT

A lactose-containing food compositions for infants for improving the stool color of infants closer to that of breast-fed infants, which contains the lactose-containing foods for infants of which the only protein source is substantially cow's milk protein and/or a processed product of cow's milk protein modified to be administered to infants, and raffinose added into the foods for infants at a ratio of at least 0.05% (by weight) in a ready-to-use state. This food composition provides foods for infants more suitable for infant growth (infant formula, protein hydrolyzed formula, formula for low-birth-weight infants, follow-up formula, etc.) without causing a green stool which is observed when administering a conventional food for sucking infants, of which the only protein source is substantially cow's milk protein and/or a processed product of cow's milk protein.

4 Claims, No Drawings

LACTOSE-CONTAINING FOOD COMPOSITION FOR INFANTS

TECHNICAL FIELD

The present invention relates to the lactose-containing food compositions for infants, which improves the stool color of an infant who has ingested lactose-containing foods for infants other than breast milk, of which the only protein source is substantially cow's milk protein and/or cow's milk protein processed product to a color similar to that of breast-fed infants.

BACKGROUND ART

As a substitute for breast milk to be administered to an infant not given breast milk with various causes or suffering from shortage of breast milk, a infant formula of which the only protein source is milk protein has been developed. Taking account of growth condition and constitution of infants, many food products for infants of which the only protein source is milk protein or processed milk protein have been developed. Examples of these products other than infant formula include follow-up formula for infants older than six months of age and protein hydrolyzed formula for infants having allergic constitution.

However, along with the fortification of nutrients necessary for the growth of infant and the modification of nutritional compositions closer to breast milk for the purpose of improving these products, it has been pointed out that stool of infants ingesting these products apparently differs from that of breast-fed infants. More specifically, in case of infants ingesting infant formula in which the iron is fortified to satisfy nutritional requirements of infants and the ratio of casein protein to whey protein is increased to a level similar to that of breast milk (i.e., the ratio of whey protein is increased), the stool color is known to be green with higher frequency (Journal of Pediatric Gastroenterology and Nutrition, Vol. 4, p. 771, 1985).

Similarly in case of infants having ingested protein hydrolyzed formula because of their allergic constitution, it is known that the stool color also become green with higher frequency (Pediatrics, Vol. 95, p. 50, 1995).

More recently, there has been developed a protein hydrolyzed formula in which all protein of the formula is appropriately hydrolyzed and which is expected to have a preventive effect of allergic diseases. The stool color of infants who ingest this product, is also tended to be green (Shokuhin Kogyo (The Food Industry), Vol. 38, No. 4, p.55, 1995).

These facts evidence that infant formula and various related products thereof have not as yet reached the level of breast milk in many aspects, and prompt improvement has been demanded.

With a view to solving the problem of green stool of infants, improvement of green stool by adding fruct-oligosaccharide (namely β-2,1-fruct-oligosaccharide and/or β-2,6'-fruct-oligosaccharide) with infant formula at a ratio of from 2 to 5% (by weight) is tried (Japanese Patent Provisional Publication No.266,937/91). According to the Publication No.266,937/91, even in infants having ingested infant formula added with fructo-oligosaccharide at a ratio of from 2 to 3% (by weight), the ratio of yellow stool is only up to a half (44 to 50%). Since the ratio of yellow stool among breast-fed infants surveyed as reference is at least 90%, presence of marked difference between the two cases is disclosed.

For the purpose of reducing stool odor and improving stool character such as color and hardness by means of improvement of intestinal condition, an invention covering an intestinal condition improving agent containing a mushroom extract alone or mushroom extract, a dietary fiber and/or oligosaccharide is disclosed (Japanese Patent Provisional Publication No.238,945/93), and as a concrete embodiment of this oligosaccharide, soy oligosaccharide is disclosed. In this Publication No.238,945/93, mushroom extract is an essential component, and it discloses that a synergism of the mushroom extract and oligosaccharide or dietary fiber cleans the intestinal condition and considerably improves odor, color, hardness and the like of stool.

On the other hand, raffinose (which is composed of glucose, galactose and fructose) is known to be contained in a certain amount in soybean formula mainly composed of soybean protein, together with stachyose as oligosaccharide resulting from the raw material (Journal of Dairy Research, Vol. 53, p. 293, 1986). Some of these products are popularly used in Europe and the United States, and in infants having ingested soybean formula, a high frequency of green stool is observed in spite of inclusion of raffinose (Pediatrics, Vol. 95, p. 50, 1995).

The most important differences between breast-fed and formula-fed infants are color and frequency of bowel movement. While in breast-fed infants, the frequency of stool presenting yellow color is high, and the daily frequency of bowel movement is also high, formula fed infants are known to show a high frequency of presenting green stool color and apparently lower daily frequency of bowel movement as compared with breast-fed ones (The Journal of Child Health, Vol. 43, p. 618, 1984). This problem of green stool is most frequently taken up in childcare consultation, and one of the most anxious matter of mothers, although this is not an indicator of morbid syndromes.

The phenomenon of green stool is thought to be due to the secretion ratio of bilirubin and biliverdin, which are bile pigments secreted from gallbladder, and to the alteration of those substances through the oxidative or reductive reactions occurred directly or indirectly in the intestine. Therefore, in an infant administered with infant formula containing large quantity of substances affecting oxidation and reduction of the contents in the intestine (iron, for example), the frequency of green stool becomes higher. It is furthermore known that, in such iron-fortified infant formula, if the ratio of whey protein in total protein is increased, stool tends to become green more frequently (Journal of Pediatric Gastroenterology and Nutrition, Vol. 4, p. 771, 1985).

The trials to improve the stool color of infants having ingested foods for infants other than breast milk to a level closer to that of breast-fed infants, have been unsuccessful, and there has been a demand for a food for infants which improves the stool color of sucking infants.

DISCLOSURE OF INVENTION

The present invention has an object to provide the lactose-containing food compositions for infants which minimizes the frequency of green stool observed in infants having ingested a conventional lactose-containing food composition for infants, of which the only protein source is substantially cow's milk protein and/or a processed product thereof.

The present invention provides the lactose-containing food compositions for infants for improving the stool color of infants closer to that of breast-fed infants, which comprises lactose-containing foods for infants of which the only protein source is substantially cow's milk protein and/or a processed product of cow's milk protein modified to be administered to infants, and raffinose added into the foods for infants at a ratio of at least 0.05% (by weight) in a ready-to-use state.

A preferred embodiment of this invention is that the raffinose is added to a ratio of from 0.1 to 0.2% (by weight) in a ready-to-use state.

Another embodiment is that the lactose-containing food compositions for infants takes the form of infant formula, protein hydrolyzed formula, formula for low-birth-weight infants or follow-up formula.

The present inventors carried out extensive studies regarding food products for improving the stool color of infants, and we found the possibility of remarkably improving stool color as compared with that resulting from a conventional formula for infants, by adding crystal raffinose purified from beet sugar into the lactose-containing foods for infants, of which the only protein source is substantially cow's milk protein or a processed product thereof. More specifically, stool of an infant having ingested the lactose-containing food composition of which the only protein source is substantially cow's milk protein or a processed product thereof, added with raffinose, immediately becomes yellow stool which may be called golden. We thus completed the present invention. In addition, the fact that the required quantity of added raffinose is very slight as compared with the effective quantity of oligosaccharides reported to date as being effective for improving the stool character has apparently a very important significance considering the nutritional meaning of these lactose-containing food compositions for infants.

By using the lactose-containing food compositions for infants of the present invention, the following effects are achieved:
1) The stool color of an infant ingested the lactose-containing food compositions for infants of the present invention becomes yellow almost the same as that of a breast-fed infant. This makes it possible to solve anxiety in childcare of the mother.
2) The lactose-containing food compositions for infants of the present invention gives no adverse effect to growth of an infant.
3) The lactose-containing food compositions for infants of the present invention requires no additional or complicated process, and can be easily manufactured by the similar process to the conventional one.

Now, the preferred embodiments of the present invention are described below in detail. In the following description, all value in percentage are by weight except for values showing the ratio of improvement of stool color.

BEST MODE FOR CARRYING OUT THE INVENTION

The term the lactose-containing food used in the present invention is a generic name of various kinds of foods for infants which includes infant formula used during sucking period as a substitute for breast milk, follow-up formula used in and after the weaning period, protein hydrolyzed formula used for infants having allergic constitution, and formula for low-birth-weight infants used for sucking infants having a body weight lower than 2,500 g, and lactose accounts for at least 50% of the total carbohydrate contained in these kinds of food.

More specifically, in any of these lactose-containing foods for infants, the only protein source is substantially milk protein of casein, whey, a mixture thereof (whole milk powder, skim milk powder, for example), a purified product thereof (whey protein concentrate, for example), a milk protein processed product such as hydrolyzed product thereof, or a mixture of milk protein and milk protein processed product, and other protein such as soybean protein is not substantially contained.

Raffinose used in the present invention may be any of a substance resulting from beet, and chemically or biochemically synthesized substances. Raffinose, which is not contained in breast milk, has been found to be in soybean formula in a certain quantity together with stachyose as oligosaccharide. Cases of a long-term use as a formula for sucking infants have been experienced in the form of foods for infants based on soybean formula. As raffinose is a trisaccharide comprising galactose, glucose and fructose, and it is apparent that it poses no problem in infant nutrition, even when taking account of the component carbohydrates.

Since raffinose itself is a non-digestible trisaccharide, its energy efficiency is known to be lower than that of lactose or sucrose. When blending or adding it to a food for a sucking infant requiring much energy for growth, the quantity should preferably be the minimum possible. As is clear from Experiments described later, raffinose should be blended or added to a ratio of at least 0.05%, or more preferably, within a range of from 0.1 to 0.2% in a formula adjusted so as to permit administration to a sucking infants.

The lactose-containing food compositions for infants of the present invention can be manufactured by a conventional method except that substantially cow's milk protein and/or a processed product thereof should be the only protein source, and that raffinose in a prescribed quantity should be blended or added. More specifically, it is possible to manufacture it by dissolving raffinose in a prescribed quantity in water together with various other raw materials necessary for forming the lactose-containing food compositions for infants, or raffinose may be mixed in the formed of powder by a conventional method with various other raw materials in powder form necessary for the lactose-containing food compositions for infants. It is thus possible to very easily manufacture it without the necessity of an addition or a complicated process.

The lactose-containing food compositions for infants of the present invention is in liquid or powder form. When in the form of liquid, it may be heated to a given temperature and directly administer it to a sucking infant. When in the form of powder, it may be dissolved in warm water of a given temperature with a prescribed concentration (the resultant liquid is a formula solution). It can be administered in the same manner as in the conventional administration of the foods for infants.

Now, effects of the present invention are described in detail by means of Experiment.

EXPERIMENT

This experiment was carried out to investigate the effect of the quantity of raffinose added to various lactose-containing foods for infants, of which the only protein source is cow's milk protein or a processed product thereof, and which comprises lactose as the main carbohydrate.
1) Preparation of Samples Infant formula, protein hydrolyzed formula, formula for low-birth-weight infant and follow-up formula were prepared in the same manner as in Examples 1 to 4 except that raffinose (made by Nippon Beet Sugar MFG., Co.,LTD.) was added or not at the ratio shown in Table 1. As a control, a lactose-free formula was prepared by the following method.

Commercially available casein (made by Nippon Proteins Co.,LTD.) in a quantity of 13.5 kg, 20.8 kg fat mixture (made by Nippon Oil & Fats Co.,LTD.), 59.0 kg soluble polysaccharide (made by Showa Sangyo Co.,LTD.), 5.2 kg sucrose (made by Nippon Beet Sugar MFG., Co.,LTD.), 23 g vitamin mixture (made by Tanabe Seiyaku Co.,LTD.), 550 g mineral mixture (made by Tomita Seiyaku Co.,LTD.) and 880 g raffinose (made by Nippon Beet Sugar MFG., Co., LTD.) were added to 200 l water, and standardized. The resultant standardized milk solution was homogenized. The homogenized solution was sterilized at 121° C. for two seconds, and then, the sterilized standardized milk solution was concentrated, and spray-dried, thus obtaining about 97 kg powdered lactose-free control formula.

2) Methods

Each sample was dissolved to a prescribed concentration, and continuously administered to groups of 30 sucking infants. After three days from the beginning of the test, stool was sampled for three days, and stool color was visually observed by five men and women. The number of infants showing yellow stool was confirmed and the effect of addition of raffinose was tested.

Each group comprised 15 male and 15 female infants, who were two to four months old for the infant formula, two to four months old for the protein hydrolyzed formula, two to four months old for the formula for low-birth-weight infants, six to eight months old for the follow-up formula, and two to four months old for the lactose-free control formula.

3) Results

The results of the test are as shown in Table 1. As is clear from Table 1, the stool color improving effect of raffinose slightly differs between kinds of lactose-containing foods for infants. Except for the control (lactose-free formula), the ratio of infants' stool color improved to yellow increased to over 50% in samples to which raffinose was added at a ratio of at least 50 mg/100 ml (0.05%). In samples to which raffinose was added at a ratio of 100 mg/100 ml (0.1%), the ratio of infant's stool color improved to yellow increased to 60 to 80%, and in samples to which raffinose was added at a ratio of 200 mg/100 ml (0.2%), the ratio of infant's stool color improved to yellow increased to 70 to 90%.

On the other hand, in the case of the lactose-free control formula, of which the only protein source is cow's milk protein or a processed product thereof, but which does not contain lactose, no increase was observed in the ratio of infant's stool color improved to yellow, irrespective of the quantity of added raffinose.

These results suggest that the improving effect of infants' stool color by the lactose-containing food compositions for infants of the present invention is not achieved as an effect of raffinose alone, but the effect is brought about by the fact that raffinose is added to the lactose-containing foods for infants of which the only protein source is cow's milk protein or a processed product thereof and of which the main carbohydrate is lactose. These results very well agree with the foregoing report (Pediatrics, Vol. 95, p. 50, 1995) to the effect that, in the case of soybean formula which contains raffinose but not cow's milk protein or lactose at all, the frequency of stool becoming green for an infant having ingested it becomes higher.

It is confirmed from the results as described above that, in the lactose-containing foods for infants, of which the only protein source is cow's milk protein or a processed product thereof and which contains lactose, addition of only 0.05% raffinose improves stool color in more than 50% of infants. This is a remarkable effect so far unavailable with the conventional technology.

A similar test was carried out also for samples to which more than 0.2% raffinose were added: no marked improvement was observed in stool color as compared with the samples containing 0.2% raffinose. Furthermore, from the result of tests carried out by changing the kind of lactose-containing foods for infants and the manufacturing method, substantially similar results were observed.

TABLE 1

| Sample | Conc. of raffinose (mg/100 ml) | | | | |
|---|---|---|---|---|---|
|  | 0 | 25 | 50 | 100 | 200 |
| Infant formula | 8 | 11 | 20 | 24 | 25 |
| Protein hydrolyzed formula | 7 | 9 | 17 | 20 | 22 |
| Formula for low-birth-weight infant | 5 | 7 | 16 | 19 | 22 |
| Follow-up formula | 9 | 12 | 21 | 25 | 27 |
| Lactose-free formula | 7 | 8 | 10 | 8 | 9 |

(Note) Numbers represent the infants presenting yellow stool from among 30 cases of infants administered with each sample.

EXAMPLES

Now, the present invention is described further in detail by means of Examples. It is needless to mention that the present invention is not limited in any manner by the following Examples.

Example 1

Commercially available whey powder (made by Domo Food Ingredients Company) in an amount of 4.3 kg was dissolved in 38.7 l service water; pH was adjusted to 8.0 with 1N sodium hydroxide; 17.2 g of commercially available trypsin (made by Novo Nordisk Bioindustry LTD.) were added; the solution was hydrolyzed at 37° C. for 12 hours; then enzyme was inactivated by heating at 80° C. for 10 minutes; the product was cooled to the room temperature; and precipitate was removed by continuous centrifugal separation, thereby obtaining transparent supernatant liquid. The resultant supernatant liquid was concentrated to 30%, and spray-dried, thereby obtaining about 3.6 kg of hydrolyzed product of powdered whey protein with a degree of hydrolysis of about 50%.

To 200 kg of fresh raw milk, there were added 3.6 kg of hydrolyzate as described above, 2.8 kg of desalted whey powder (made by Domo Food Ingredients Company), 25.65 kg of fat mixture (made by Nippon Oil & Fats Co.,LTD.), 43.7 kg of lactose (made by MEGGLE GMBH Company), 22 g of vitamin mixture (made by Tanabe Seiyaku Co., LTD.), 550 g of mineral mixture (made by Tomita Seiyaku Co.,LTD.), and 410 g of raffinose (made by Nippon Beet Sugar MFG., Co.,LTD.). The resultant mixture was standardized, and the standardized milk solution obtained was homogenized, and sterilized at 121° C. for two seconds. The thus sterilized solution was then concentrated, and spray-dried, thereby obtaining about 90 kg of powdered infant formula.

Raffinose is contained in an amount of 50 mg in 100 ml of 13% standardized solution of this infant formula. The standardized solution was administered to sucking infants aged one to five months old, and a test was carried out in the same manner as in the Experiment: the stool color was improved to yellow or yellow-green within two days.

Example 2

Commercially available whey powder (made by Domo Food Ingredients Company) in an amount of 47 kg was dissolved in 450 l tap water, of which pH was adjusted to 8.0 with 1N sodium hydroxide, and 190 g of commercially available trypsin (made by Novo Nordisk Bioindustry LTD.) were added. The resultant solution was hydrolyzed at 37° C. for 12 hours, then heated to 80° C. for 10 minutes to inactivate enzyme, cooled to the room temperature, and subjected to centrifugal separation to remove precipitates, thus obtaining clear supernatant liquid. The supernatant liquid thus obtained was concentrated to 30%, spray-dried, and about 40 kg of whey protein hydrolyzate powder of a hydrolysis degree of about 50% was obtained.

Commercially available casein (made by Nippon Proteins Co.,LTD.) in an amount of 10 kg was dissolved in warm water adjusted to pH 7.3 with 10% sodium hydroxide solution to prepare a casein solution having a concentration of 18%. The resultant casein solution was heated for sterilization by a conventional method, left to cool to the room temperature, pH-adjusted to 9.0 with 10% sodium hydroxide, added with 100 g of commercially available papain (made by Amano Pharmaceutical Co.,LTD.) and 100 g of pancreatin (made by Amano Pharmaceutical Co.,LTD.), hydrolyzed at 45° C. for 16 hours, heated to 90° C. for ten minutes to inactivate enzyme, and cooled to the room temperature. Then, after removing precipitates through Celite filtration, the transparent filtered solution was concentrated, spray-dried, and about 7 kg of casein hydrolyzate powder was obtained.

The foregoing hydrolyzate of whey protein in an amount of 40 kg, 7 kg of casein hydrolyzate, 46 kg of purified lactose (made by MEGGLE GIMBH Company) and 14.6 kg of soluble polysaccharide were dissolved in 300 l purified water. Then, 40 kg of fat mixture (made by Nippon Oil & Fats Co.,LTD.), 35 g of vitamin mixture (made by Tanabe Seiyaku Co.,LTD.), 920 g of mineral mixture (made by Tomita Seiyaku Co.,LTD.) and 1,120 g of raffinose (made by Nippon Beet Sugar MFG., Co.,LTD.) were mixed and dissolved. The solution was homogenized, sterilized at 120° C. for two seconds, concentrated, spray-dried, and about 145 kg of powdered protein hydrolyzed formula was obtained.

Milk protein contained in this protein hydrolyzed formula was totally enzymatically hydrolyzed, and 100 mg of raffinose were contained per 100 ml of 13% standardized solution.

This standardized solution was administered to sucking infants aged one to five months old, and a test was carried out in the same manner as in the Experiment: the stool color was improved into yellow or yellow-green within two days.

Example 3

Desalted whey powder (made by Domo Food Ingredients Company) in an amount of 7.5 kg, 2.1 kg of commercially available casein (made by Nippon Proteins Co.,LTD.), 12.5 kg of fat mixture (Nippon Oil & Fats Co.,LTD.), 27.8 kg of lactose (made by MEGGLE GMBH Company), 15.8 kg of polysaccharide (made by Showa Sangyo Co.,LTD.), 22 g of vitamin mixture (made by Tanabe Seiyaku Co.,LTD.), 840 g of mineral mixture (made by Tomita Seiyaku Co.,LTD.) and 870 g of raffinose (made by Nippon Beet Sugar MFG., Co.,LTD.) were added to 200 kg of fresh raw milk, and the resultant mixed solution was standardized. The thus standardized milk solution was homogenized, and sterilized at 121° C. for two seconds. Then, the sterilized standardized milk solution was concentrated, spray-dried, and about 90 kg of formula for low-birth-weight infants in powder form was obtained.

This formula for low-birth-weight infants contained 120 mg of raffinose per 100 ml of 14% standardized solution. This standardized solution was administered to infants having body weights ranging from 1,500 to 2,400 g, and a test was carried out in the same manner as in the Experiment: the stool color was improved into yellow or yellow-green within two days.

Example 4

Desalted whey powder (made by Domo Food Ingredients Company) in an amount of 7.5 kg, 2.1 kg of commercially available casein (made by Nippon Proteins Co.,LTD.), 12.5 kg of fat mixture (made by Nippon Oil & Fats Co.,LTD.), 27.8 kg of lactose (made by MEGGLE GMBH Company), 15.8 kg of polysaccharide (made by Showa Sangyo Co., LTD.), 22 g of vitamin mixture (made by Tanabe Seiyaku Co.,LTD.), 840 g of mineral mixture (made by Tomita Seiyaku Co.,LTD.), and 560 g of raffinose (made by Nippon Beet Sugar MFG., Co.,LTD.) were added to 200 kg of fresh raw milk, and the resultant mixed solution was standardized. The thus standardized milk solution was homogenized, and sterilized at 121° C. for two seconds. Then, the sterilized standardized milk solution was concentrated, spray-dried, and about 90 kg of powdered follow-up formula was obtained.

This follow-up formula contained 75 mg of raffinose per 100 ml of 14% standardized solution. This standardized solution was administered to infants aged six to ten months old, and a test was carried out in the same manner as in the Experiment, the stool color was improved into yellow within two days.

INDUSTRIAL APPLICABILITY

The lactose-containing food compositions for infants of the present invention is put to market as infant formula, protein hydrolyzed formula, formula for premature infants, and follow-up formula.

What is claimed is:

1. A lactose-containing food composition for infants for improving the stool color of infants closer to that of breast-fed infants, which comprises lactose-containing food for infants of which the only protein source is substantially cow's milk protein and/or a processed product of cow's milk protein modified to be administered to infants, and raffinose added to the food for infants in a ratio of 0.05 to 0.2% (by weight) in a ready-to-use state.

2. The lactose-containing food compositions for infants according to claim 1, wherein raffinose is added in a ratio in a range of from 0.1 to 0.2% (by weight) in a ready-to-use state.

3. The lactose-containing food compositions for infants according to claim 1, wherein said composition takes a form of an infant formula, a protein hydrolyzed formula, a formula for low-birth-weight infants, or a follow-up formula.

4. The lactose-containing food compositions for infants according to claim 2, wherein said composition takes a form of an infant formula, a protein hydrolyzed formula, a formula for low-birth-weight infants, or a follow-up formula.

* * * * *